Figure 3:
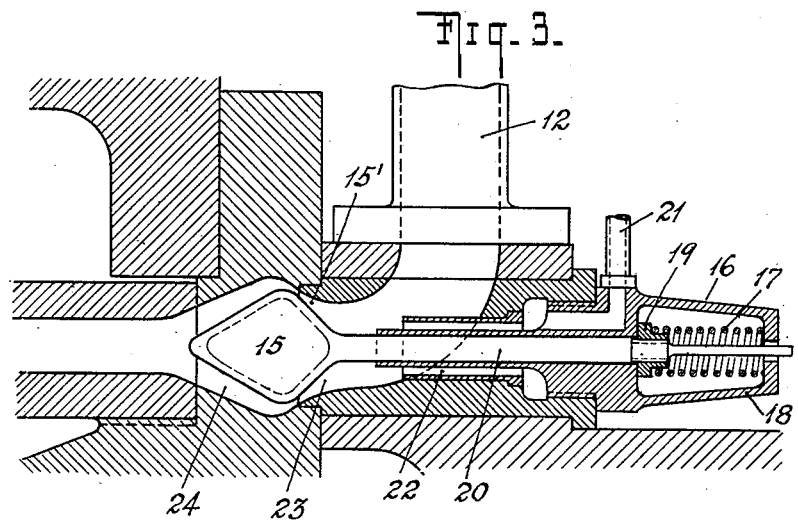

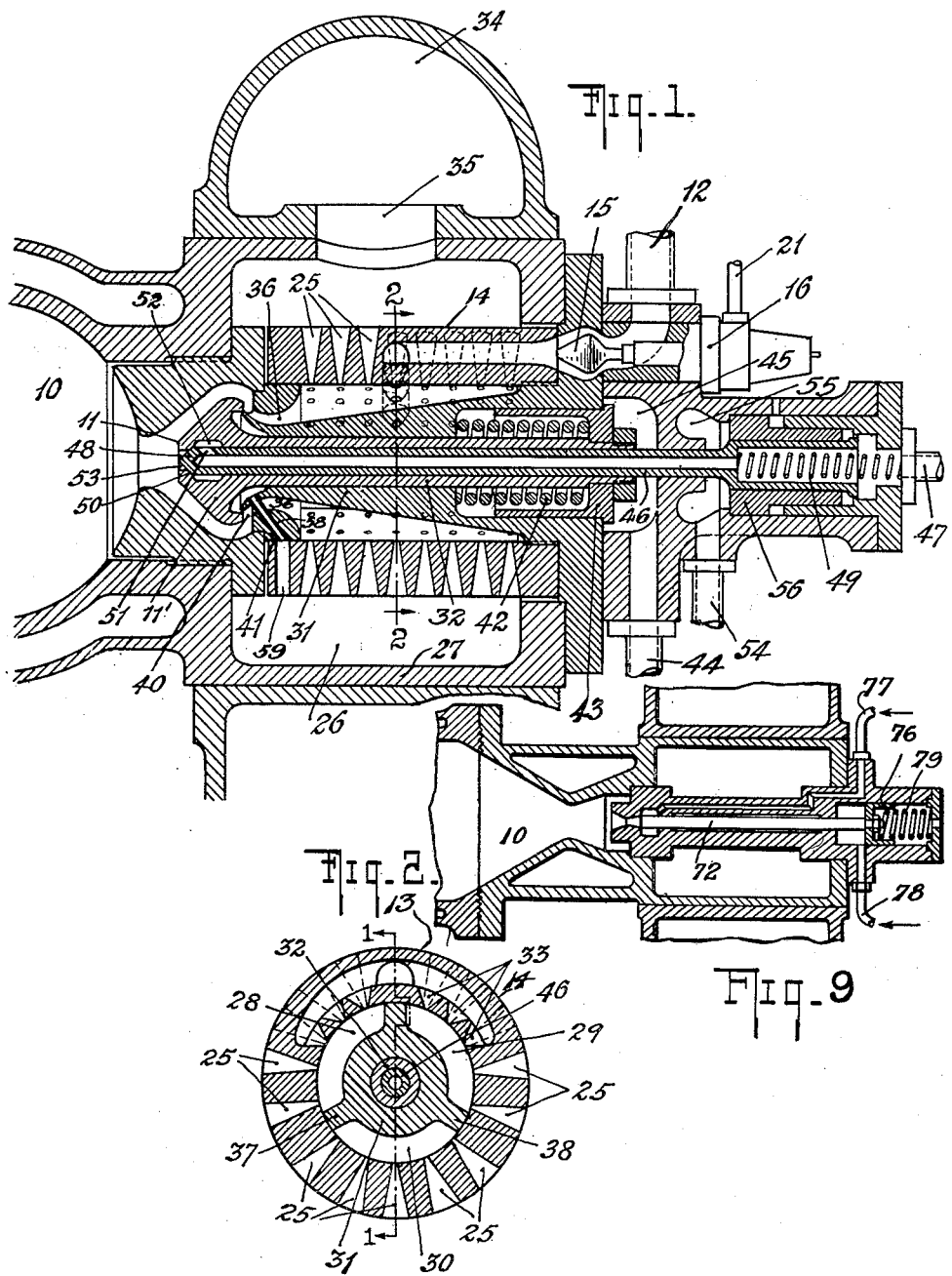

INVENTOR
HANS HOLZWARTH

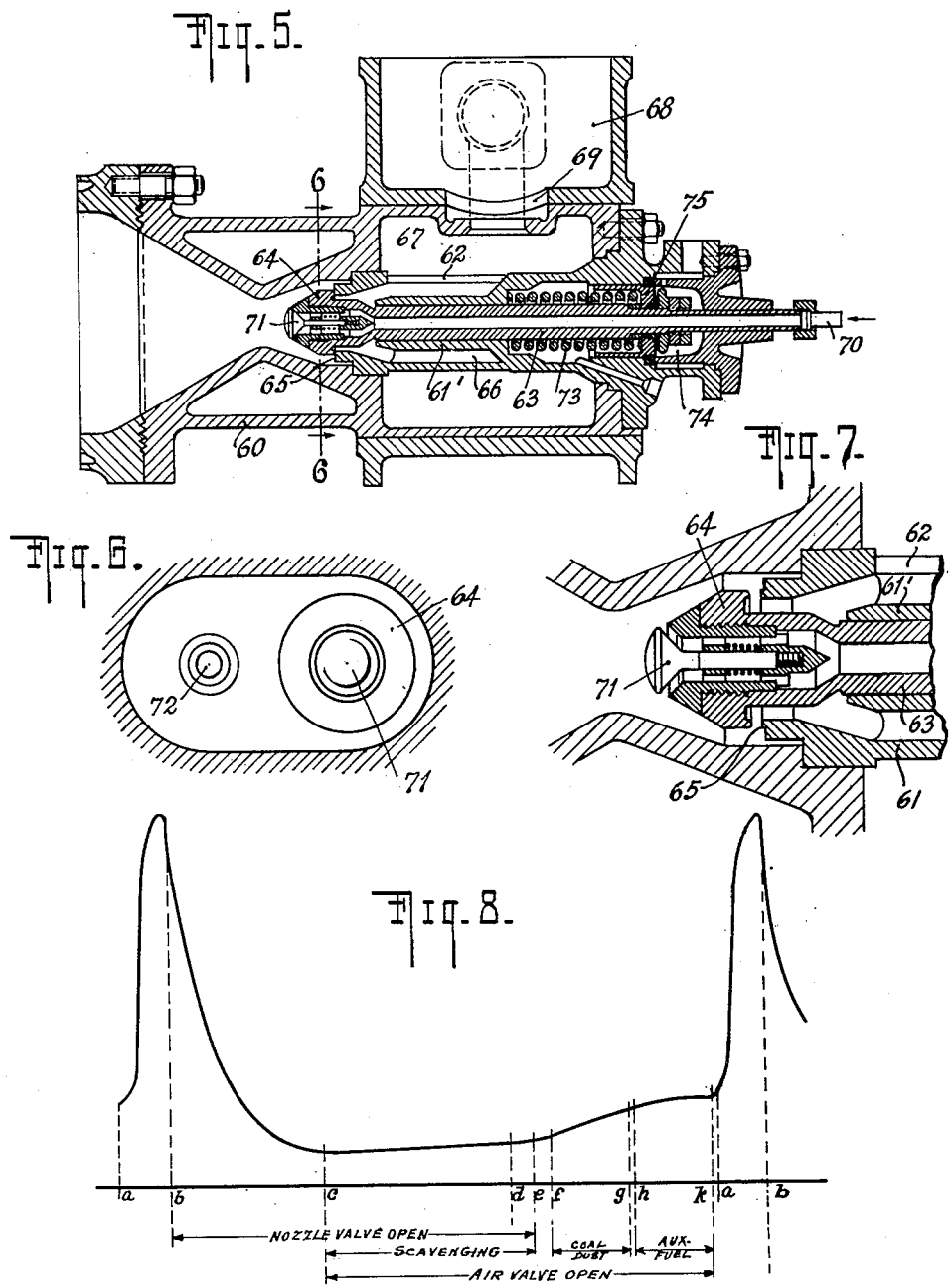

Patented Feb. 14, 1933

1,897,478

UNITED STATES PATENT OFFICE

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE

APPARATUS FOR OPERATING EXPLOSION TURBINES WITH SOLID FUEL

Application filed May 11, 1929, Serial No. 362,232, and in Germany May 21, 1928.

The present invention relates to explosion turbines of the type comprising a rotor and a plurality of constant volume explosion chambers associated therewith, and has for one of its objects to provide mechanism whereby solid or solid and fluid fuels are charged into the combustion chambers associated with such turbine in such manner that a completely uniform and homogeneous mixture of the fuels with the combustion supporting air is obtained. It is a further object of the invention to provide safety mechanism associated with the fuel and air charging devices whereby the charging conduits connected to such charging devices are protected against excessive and destructive pressures in the event of premature combustion or pre-ignition of the fuel-air mixture in the explosion chamber.

I have found that it is in general undesirable to feed coal dust into an explosion chamber in a state of heavy or dense suspension and then to mix the same with air in such chamber. A heavy suspension of coal dust tends to cake and to precipitate in the conduits and upon the seat of the charging valve, and thus disturb the normal course of operation. Furthermore, it does not become evenly distributed in the explosion chamber but tends to agglomerate into balls of varying sizes. Even though proper proportions of coal dust and air are used, a mixture so produced does not kindle, explode and burn uniformly.

I have overcome these difficulties and disadvantages by diluting the heavy suspension of coal dust with air, preferably in a plurality of stages, before the same is charged into the explosion chamber. By such repeated dilution, the coal dust particles are more completely segregated from each other and more uniformly suspended in the air vehicle. The mixing of the coal dust and air is thus carried out not only in a plurality of stages but over a more extended period of time than would be the case if the mixing were effected only in the explosion chamber. More complete mixing is also obtained by my improved method of charging the coal dust and air because the same is effected in the conduits before the media reach the valve-controlled inlet and while they are traveling at high speed and are subjected to injector and whirling action which operates to break up the larger or aggregated particles and produce a very homogeneous mixture.

As the coal dust and air mixture, when the same is produced by repeated dilution, becomes more and more explosive with each dilution, I provide various safety features whereby the conduits leading to the inlet valves, and especially the coal dust and auxiliary fuel conduits, are protected against excessive pressure in the event of premature explosion. I preferably provide fixed or movable check or pressure dampening devices, or both, in the path of at least one of the air currents destined to dilute the coal dust. The effects of a premature explosion in the combustion chamber will therefore be transmitted by the diluted and explosive coal dust suspension only to such check or pressure dampening devices. In the preferred embodiment of my invention I surround the coal dust inlet valve with a fixed annular member which communicates on all sides with an air conduit and is provided with a plurality of nozzles which connect such air conduit with the valve, as set forth more fully in my copending application Serial No. 335,695 which matured into U. S. Patent 1,852,164. These nozzles taper, i. e. diminish in cross-section in the direction of normal flow of the air, and are always open, so that no resistance is opposed to the flow of the air; they operate, however, to brake or dampen the pressure wave traveling in an opposite direction following a premature explosion in the explosion chamber. I also provide in the path of the coal dust similar fixed dampening nozzles or a movable check device or both. Where I employ a movable check device, I preferably provide mechanical, hydraulic or other means for holding the same in open position independently, or without the aid, of the pressure of the coal dust suspension. Such construction insures regularity in the flow of the coal dust and eliminates the danger of precipitation and balling of the coal dust, thus avoiding variations in the composition of the suspension and clogging of the conduit, as occurs when the check device, such as a valve, is held open by the pressure of the suspension itself. In order to insure completely against precipitation of coal dust at the point where such check device is located, I preferably arrange means for introducing a stream of air slightly in advance thereof, such air playing upon the closure member of such device and simultaneously serving to dilute the coal dust suspension. In order further to equalize any irregularities that may arise in the suspension due to the fact that the combustion air conduit opens only at one side into the spaces surrounding the inlet valve, I cause at least one of the diluting streams of air, preferably the last stream, to enter the stream of coal dust concentrically with the axis of the inlet valve. The valve casing which surrounds the valve and also the member containing the dampening nozzles, where such member is used, is preferably made strong enough to withstand the full force of a premature explosion and may be made integral with the explosion chamber. Such construction has the advantages that joints and other irregularities along the inner wall of the chamber are eliminated; such irregularities favor the deposit of slag and ash and interfere with the flow of the coal dust, so that their elimination is highly desirable.

An auxiliary fuel may be, and preferably is, used to facilitate the ignition of the solid fuel. By constructing the auxiliary fuel valve in the form of a needle valve, I avoid the necessity of providing the auxiliary fuel conduit with a safety device as such valve itself acts as a throttling member and prevents injury to such conduit in the event of pre-ignition. The auxiliary fuel is preferably charged into the explosion chamber at a pressure much higher than that prevailing in such chamber, for instance, a multiple of such pressure, so that not only is the time of admission reduced, but the fuel penetrates more completely into the chamber and mixes more thoroughly with the coal dust particles.

In order to avoid collection of coal dust in the space between the head of the inlet valve and the guide for such valve, I direct a stream of air into such space to scavenge the same.

Figure 4:
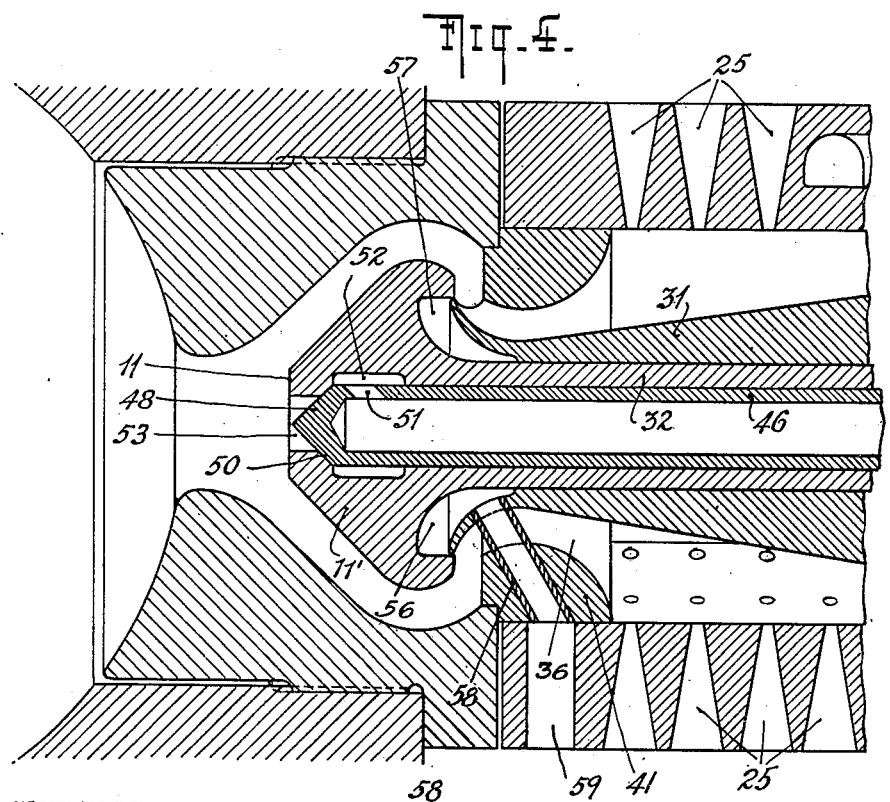

In the accompanying drawings are illustrated by way of example several embodiments of the invention without defining the limits thereof. In said drawings, Fig. 1 is a section taken in part along the line 1—1 of Fig. 2 and illustrates a preferred arrangement of the inlet valves at the charging side of an explosion chamber; Fig. 2 is a section along the line 2—2 of Fig. 1; Fig. 3 shows a detail of Fig. 1 on an enlarged scale; Fig. 4 shows on an enlarged scale a modification of the construction of the inlet valve; Fig. 5 is a sectional view of a modified inlet valve construction; Fig. 6 is an elevational view of the inlet valves of Fig. 5 and is taken along the line 6—6 of such figures; Fig. 7 is an enlarged view of a modified coal dust valve construction; Fig. 8 is a time-pressure diagram indicating the timing of the inlet valves; and Fig. 9 is a sectional view illustrating a needle valve for charging a fluid fuel into the explosion chamber.

The numeral 10 indicates one of the constant volume combustion chambers forming part of the explosion turbine, each of such chambers being periodically fed with fuel which is exploded therein, as described hereinbelow, and the resulting combustion gases discharged through a nozzle valve and directed by a nozzle against the rotor of the turbine. As the nozzle valve, nozzle and rotor form no part of the present invention and are well known in the art, they have not been shown on the drawings.

In accordance with the embodiment of the present invention illustrated in Figs. 1 to 4, the combustion chamber 10 is intermittently charged with fuel in the form of a coal dust suspension by means of a valve 11 having a valve head 11′, each of the successive charges of coal dust, after one or more dilutions with air, being charged in a state of uniform distribution with a quantity of air sufficient to support complete combustion of the fuel.

The coal dust is conveyed from a source of supply by means of a conduit 12, the dust in such conduit being in a state of heavy suspension with a minimum quantity of air. This initial, rich suspension may be formed in a mixing chamber of any suitable construction (see, for example, my United States Patent No. 1,810,768) wherein successive separate coal dust charges are brought into a state of suspension by a current of air. The suspension coming from conduit 12 enters an arcuate distributing chamber 13 located in a fixed annular member 14 surrounding the valve 11. Before the suspension reaches the chamber 13 it travels past a double-coned valve 15 located in the conduit 12 and forming part of a movable check device 16. As shown in Fig. 3, the valve is urged away from its seat 15′ into its open position by a pressure spring 17 arranged in the valve housing 18 and engaging an abutment 19 fixed on the stem 20 of the valve. The latter is thus kept normally open without the aid of the pneumatic pressure in the conduit 12. As the presence of the valve 15 in conduit 12 introduces an obstruction, even if only to a slight degree, in the path of the mixture, I cause an air current fed by a conduit 21 into an annular space 22 surrounding the valve stem 20 to flow constantly toward the valve 15. In this way precipitation of coal dust upon the valve 15 and in the passageway 23 surrounding the valve is prevented, while at the same time an injector action is produced at a point in advance of the valve which favors the movement of the coal dust suspension through the passageway 23. The coal dust and air mixture in passing over the diverging and converging constricted passageways 23 and 24 surrounding the double-coned valve 15 is given a whirling motion which further tends to keep the coal dust in a state of suspension. The dense coal dust suspension charged by conduit 12 into the arcuate distributing chamber 13 is in this manner given an initial dilution with an additional quantity of air as it travels through the passageway 23.

The annular member 14 within which the distributing chamber 13 is located is provided with a plurality of nozzles 25 which connect an annular chamber 26, defined by an extension 27 of the combustion chamber walls and the annular member 14, with the channels 28, 29 and 30 located between such annular member and a fixed sleeve 31 within which the stem 32 of valve 11 slides. The nozzles 25 decrease in cross-section toward the channels 28, 29, and 30 and operate to dampen the pressure wave resulting from pre-ignition of the fuel and air mixture in the combustion-chamber 10, as described more fully in my above-mentioned U. S. Patent 1,852,164. The distributing chamber 13 is likewise connected with the channels 28 and 29 by means of dampening nozzles 33 as shown in Fig. 2. The channels 28 and 29 receive the main portion of combustion supporting air from the chamber 26 through the nozzles 25, the chamber 26 being fed with a constant stream of air from an air conduit 34 to which it is connected by a port 35. The already diluted coal dust and air mixture fed into the channels 28 and 29 is thus further diluted therein and then conducted to the annular space 36 surrounding the sleeve 31 adjacent to the valve head 11'. Through the channel 30, which is separated from the channels 28 and 29 by means of ribs 37 and 38 integral with the sleeve 31 (Fig. 2), an additional quantity of air coming from chamber 26 through nozzles 25 is charged a short distance in advance of the inlet opening 40 between the open valve head 11' and its seat 41 into the mixture entering the space 36 after dilution in channels 28 and 29. This additional quantity of air travels concentrically with the axis of the valve and comprises the amount necessary to produce in the combustion chamber 10 a mixture of definite composition. It will be clear from the above that the whole path of travel of the coal dust may be regarded as a single conduit into which a plurality of air conduits open at spaced points in advance of the valve 11.

It is to be noted that this conduit is closed to the atmosphere, so that when valve 11 is closed, no compressed air, or air and coal dust, are blown into the atmosphere and lost if the air supply is continuous, i. e. not valve-controlled.

The valve 11 may be controlled in any suitable manner. In the form of the invention illustrated, the valve is urged toward its closed position by means of a spring 42 which engages a piston 43 fixed on the valve stem 32. The valve is periodically opened against the pressure of spring 42 by means of oil under pressure which is charged by an oil conduit 44 into a chamber 45 located upon the side of the piston 43 opposite to spring 42, the valve closing upon exhaust of the oil in said chamber, as described in my United States Patent No. 877,194.

Means may also be provided for charging an auxiliary fuel into the explosion chamber 10 to increase the speed of combustion of the coal dust. In the form illustrated in Figs. 1 to 4, a hollow spindle 46 is slidably positioned within the valve stem 32 and is fed with the auxiliary fuel by a conduit 47. The spindle 46 terminates in a valve head 48 and is urged by a spring 49 to closed position against a seat 50 formed within the valve 11. The interior of the spindle communicates through a port 51 with an annular channel 52 which, when the valve 48 is in open position, discharges the auxiliary fuel into the explosion chamber 10 through a bore 53 in the valve 11. The valve 48 is opened by means of oil under pressure fed by a pipe 54 into a chamber 55 and adapted to move a piston 56 fixed to the spindle 46. The auxiliary fuel so charged initiates the combustion in the explosion chamber.

In order to avoid a collection of coal dust in the space 57 between the valve head 11' and the free end of sleeve 31 (see Fig. 4), I provide in the valve seat 41 and in the cup-like end of said sleeve a tubular connection 58 which communicates with the annular air chamber 26 through a bore 59 in the annular member 14. So long as the valve head 11' is away from its seat, after a charge of coal dust has been introduced into the explosion chamber the space 57 is traversed and cleaned by a current of air.

It will be clear from the above that by means of my novel mechanism I effect a gradual dilution of the coal dust suspension charged periodically by the conduit 12, such dilution being so effected that the coal dust and air mixture is kept in a constant state of agitation. As a result a mixture of uniform density is fed into the explosion chamber and rapid and complete combustion thereof insured.

The preferred form of carrying out my process is the one hereinabove described in which the coal dust and air mixture is diluted only immediately before its entry into the explosion chamber. This mode of producing the final explosive mixture has the additional advantage that as the coal dust is conveyed to the place of use, i. e. the explosion chamber, in the form of a rich, substantially non-explosive suspension and diluted only just prior to its admission to such chamber, the danger of explosion, which would exist if the coal dust were conveyed to the engine from a distant point in the form of a dilute, explosive mixture, is substantially eliminated.

The valve 15 in the conduit 12, like the nozzles 25 in the annular member 14, operates as a safety mechanism and prevents injury to the conduit 12 in the event of pre-ignition or premature explosion in the chamber 10 (i. e. before the valve 11 has completely closed). When such premature explosion occurs, the pressure wave emanating from the explosion chamber is first dampened by the nozzles 33, and if it is still of sufficient force, it closes the valve 15 against the action of spring 17, so that the conduit 12 and the blower and other mechanism connected thereto (not shown on the drawings) are protected against the destructive effect of the explosion. As the valve 15 is held open by its spring 17 and not by the pressure of the coal dust and air mixture, the possibility of irregularity and instability in the flow of the mixture is avoided and precipitation of coal dust leading to clogging of the conduit prevented. The air conduit 34, as explained above, is protected by the dampening nozzles 25.

In the embodiment of the invention illustrated in Fig. 5 the charging end of the combustion chamber 10 has bolted thereto a valve casing 60 into which is fitted a hollow member 61 which is open at 62 for a purpose to be explained hereinbelow. The member 61 is provided with a valve guide 61' within which is slidably positioned a hollow valve stem 63 the left end of which is formed as a valve head 64 which is adapted to engage a valve seat 65. The guide 61' is spaced radially inwardly from the wall of the member 61 so as to provide an annular space 66 which communicates directly with the opening 62 and with a space 67 surrounding the member 61. The space 67 is adapted to receive air under pressure from a conduit 68 through a port 69, such air entering through the opening 62 into the annular space 66 which is placed in communication with the interior of chamber 10 upon opening of the valve 64.

The hollow valve stem 63 is adapted to be fed with a coal dust-air suspension through a conduit 70. The coal dust suspension is periodically introduced into the combustion chamber at predetermined instants by means of an automatically acting check valve 71, a modified construction of which is illustrated in Fig. 7. It will be understood that the coal dust suspension is charged periodically into the stem 63 in any suitable manner.

Arranged in close proximity to the valve 64 (see Fig. 6) is a needle valve 72 (for instance like the valve 48, Fig. 1) which is automatically operated (in any well-known manner) to charge an auxiliary liquid or gaseous fuel into the combustion chamber. The needle valve is located close to the coal dust and air valve 64 in order to insure complete enveloping of the coal dust particles in the combustion chamber by the auxiliary fuel. The needle valve is shown in detail in Fig. 9 wherein the stem of the valve is indicated at 72. This stem is rigid with a control piston 76 which is normally under the action of the spring 79 tending to close the valve. The fluid fuel is charged through the conduit 77. To open the needle valve, oil under pressure is introduced at the left side of the piston 76 through conduit 78 which is connected to a hydraulic distributor which may be of any suitable type such as that shown in my United States Patent No. 877,194.

The check valve 71 which feeds the coal dust into the combustion chamber serves also as a safety member which quickly closes in the event of pre-ignition in the combustion chamber so that no dangerous surge of pressure is permitted to reach the coal dust conduit 70. The needle valve 72 operates as a throttling member and similarly prevents injury to the auxiliary fuel conduit as a result of premature explosion in the chamber 10. While the member 61 may be constructed in the form of or provided with a pressure dampening casing corresponding to the casing 14 of Fig. 1, I prefer to dispense with such construction and make the air conduit 68 of sufficient strength to withstand the pressure of gases escaping thereinto from the explosion chamber.

The valve 64 may be controlled in any suitable manner; in the embodiment shown it is open against the action of its spring 73 by means of oil under pressure admitted into chamber 74 and operative against a piston 75 fixed on the valve stem 63.

The timing of the air, coal dust and auxiliary fuel valves according to Figs. 5 to 7 will best be understood by reference to Fig. 8, there being employed any suitable timing mechanism such as those disclosed in my United States Patent No. 877,194 and in my copending application Serial No. 356,446. Following the explosion of the charge in the combustion chamber at a moment corresponding to the point $a$ in such figure the charge burns and the pressure rises until the moment $b$ is reached, when combustion is substantially complete; thereupon the nozzle valve is opened rapidly to permit the combustion gases to escape from the combustion chamber, the gases being conducted to a nozzle by which they are directed against the blades of a turbine rotor in a manner well known in the art. At the moment $c$ the expansion of the gases is complete and the pressure in the combustion chamber is substantially equal to or slightly above the exhaust pressure of the turbine. At such moment $c$, the air valve 64 is opened to admit air under pressure into the explosion chamber. The explosion chamber is of elongated cylindrical form and as shown in Fig. 5 is cone or funnel shaped at its inlet end. Due to this construction of the chamber the air entering the chamber pushes before it the residual combustion gases in such chamber in the manner of a piston, the chamber being in this manner scavenged by means of the air which is to form part of the charge for the subsequent explosion. At the moment $d$, when the forward portion of the air reaches the nozzle valve, the latter begins to close and becomes completely closed at the instant $e$. Very shortly thereafter, at the instant $f$, the coal dust is admitted until the moment $g$ is reached, whereupon the coal dust valve closes. Subsequently during the interval $h$—$k$ the needle valve 72 is opened to admit the auxiliary fuel and after the closing of such valve the ignition and explosion of the charge take place at the point $a$, after which a new cycle is begun. The nozzle valve is thus open during the interval $b$—$e$, while air is admitted during the interval $c$—$k$. The scavenging takes place during the overlapping period $c$—$e$. It will be clear from the diagram that the air valve and auxiliary valve both close at the same time at the moment $k$.

The diagram shown in Fig. 8 applies also to the embodiment shown in Figs. 1 to 4. By stopping the charging of the coal dust at the instant $g$, the advantage is obtained that air continues to flow for a short interval through the tubular connection 58 and also through the channels 28 and 29 after the feed of coal dust has ceased, so that any coal dust which may have precipitated at the valve 11 is carried into the explosion chamber and the valve thus swept clean. Consequently, no coal dust is carried into the chamber 10 by the scavenging air as soon as the valve 11 is opened following the explosion and expansion of a charge, and the possibility of pre-ignition upon contact of any so prematurely introduced coal dust with the glowing particles still present in the chamber is practically eliminated. It should be noted that in both the constructions of Figs. 1 and 5, the auxiliary fuel is admitted into the combustion chamber after all, or substantially all, of the coal dust has been charged thereinto.

Variations may be resorted to within the scope of the appended claims without departing from the spirit of the invention and parts of my invention may be used without others. For instance, the use of an auxiliary fuel may be dispensed with.

I claim:
1. In combination, an explosion chamber, a valve arranged at the charging end of such chamber, an annular member surrounding said valve and spaced therefrom to provide a space therebetween, a casing surrounding said member and spaced therefrom, said member being provided with a plurality of openings decreasing in cross-section toward said valve, a conduit for charging a coal dust suspension into the space between said member and said valve, means for charging air into said conduit to dilute such suspension, and a conduit connected to the space between the annular member and the casing and adapted to charge air through said openings into said first-mentioned space further to dilute said suspension.

2. The combination with an explosion chamber of an explosion turbine, of an inlet valve arranged at the charging end of such chamber, an annular member surrounding said valve and spaced therefrom to provide a space therebetween, a casing surrounding said member and spaced therefrom, said member being provided with a plurality of nozzle openings decreasing in cross-section toward said valve, a conduit for charging a coal dust suspension into the space between said member and said valve, means for charging air into said conduit to dilute such suspension, a conduit connected to the space between the annular member and the casing and adapted to charge air through said openings into the first-mentioned space further to dilute said suspension, and a conduit arranged to charge an additional quantity of air into the diluted coal dust suspension as the latter escapes from such space into the combustion chamber upon opening of the valve.

3. In combination, an explosion chamber, an inlet valve arranged at the charging end of such chamber, an annular member surrounding said valve and spaced therefrom to provide a space therebetween, a casing surrounding said member and spaced therefrom, said member being provided with a plurality of nozzle openings decreasing in cross-section toward said valve, a conduit for charging a coal dust suspension into the space between said member and said valve, means for charging air into said conduit to dilute such suspension, a conduit connected to the space between the annular member and the casing and adapted to charge air through said openings into the first-mentioned space further to dilute said suspension, a conduit arranged to charge an additional quantity of air into the diluted coal dust suspension as the latter escapes from such space into the combustion chamber upon opening of the valve, a check valve located in said coal dust conduit, the movable part of said check valve being swept by the coal dust suspension flowing past the closure member of such valve, and means operable independently of the pressure of the suspension flowing through the conduit and arranged to hold open the movable part of the check valve in the direction of flow of the suspension.

4. The combination as set forth in claim 2 wherein said last-mentioned conduit is so arranged as to direct its air stream into the coal dust suspension concentrically with the axis of the valve.

5. The combination as set forth in claim 2 wherein said last-mentioned conduit is so arranged as to direct its air stream into the coal dust suspension concentrically with the axis of the valve, and a movable check device located in said coal dust conduit.

6. The combination with an explosion chamber of an explosion turbine, of an inlet valve arranged at the charging end of such chamber, an annular member surrounding said valve and spaced therefrom, said valve controlling the communication between the space so formed and the interior of the explosion chamber, a casing surrounding and spaced from said member to form an annular chamber, an air conduit connected to said annular chamber, said member having therein a plurality of back-pressure dampening nozzles connecting said annular chamber and the space between said member and said valve, said member being further provided with an arcuate chamber opening into said last-mentioned space, partitions in said space forming a channel in and a channel out of direct communication with said arcuate chamber, a coal dust conduit connected to said arcuate chamber, a check valve in said last-mentioned conduit, and an air conduit arranged to direct a stream of air upon said check valve to clean the same, whereby said suspension is simultaneously initially diluted at said check valve, is further diluted with air entering through the dampening nozzles into the channel in communication with the arcuate chamber, and is again diluted shortly before entering the explosion chamber with a stream of air charged by the second channel concentric with the axis of the inlet valve.

7. The combination as set forth in claim 6, wherein the arcuate chamber communicates with the first-mentioned channel by means of a plurality of back-pressure dampening nozzles located in the annular member.

8. The combination as set forth in claim 2 wherein the last mentioned conduit is so arranged that the air charged thereby is introduced into the coal dust suspension concentrically to the axis of the valve, such combination including a check valve in the first mentioned conduit, the movable part of such check valve being swept by the suspension flowing past the closure member of the valve, and means operable independently of the pressure of the suspension flowing through such conduit and arranged to hold open the movable part of such check valve in the direction of flow of the suspension.

9. The combination of an explosion chamber, a conduit for conducting thereto a suspension of coal dust in air, a valve between said chamber and conduit adapted to be intermittently operated by external mechanism, means arranged in advance of the closure member of said valve for charging air into the conduit to dilute the coal dust suspension before its introduction into the chamber, a guide for the stem of said valve, and an air conduit arranged to introduce a current of air into the space between the valve guide and the closure member to prevent the accumulation of coal dust therein.

10. The combination of an explosion chamber, a conduit for conducting thereto a suspension of coal dust in air, a valve between said chamber and conduit adapted to be intermittently operated by external mechanism, means arranged in advance of the closure member of said valve for charging air into the conduit to dilute the coal dust suspension before its introduction into the chamber, and a conduit arranged to charge a current of air over the portion of the path traversed by the coal dust immediately in advance of said closure member after the charge of coal dust has ceased to sweep any precipitated coal dust into the chamber.

11. In combination, an explosion chamber, a conduit for conducting to said chamber a stable, rich suspension of coal dust in air at high velocity, a valve between the explosion chamber and the delivery end of said conduit adapted to be intermittently operated by external mechanism, and means arranged in advance of the closure element of said valve for diluting with air the coal dust and air suspension before its introduction into the chamber, whereby the diluting air enters the suspension while the latter is in rapid motion and a uniform distribution of the coal dust in the air is promoted.

12. In combination, an explosion chamber, a conduit for conducting to said chamber a stable, rich suspension of coal dust in air at high velocity, a valve between the explosion chamber and the delivery end of said conduit adapted to be intermittently operated by external mechanism, and a plurality of air conduits spaced in the direction of flow of said mixture and opening into the coal dust-air conduit in advance of the closure member of said valve for diluting with air the coal dust and air suspension before its introduction into the chamber, whereby the diluting air enters the suspension while the latter is in rapid motion and a uniform distribution of the coal dust in the air is promoted.

13. The combination as set forth in claim 11 wherein said means comprises an air conduit arranged to charge air into the coal dust-air suspension transversely to the direction of flow of the latter.

14. In combination, an explosion chamber, a conduit for conducting to said chamber a stable, rich suspension of coal dust in air at high velocity, a valve between the explosion chamber and the delivery end of said conduit adapted to be intermittently operated by external mechanism, a member surrounding said valve and spaced therefrom, the closure member of said valve controlling the communication between the space so created and the explosion chamber, said space forming part of said conduit, means for conducting air into the portion of the conduit in advance of said space to dilute the coal dust-air suspension therein before it reaches such space, and an air conduit in communication with said space and operative to charge air into the diluted coal dust-air suspension in such space still further to dilute said suspension, whereby the diluting air enters the suspension while the latter is in rapid motion and a uniform distribution of the coal dust in the air is promoted.

15. In combination, an explosion chamber, a conduit for conducting to said chamber a stable, rich suspension of coal dust in air at high velocity, a valve between the explosion chamber and the delivery end of said conduit adapted to be intermittently operated by external mechanism, a member surrounding said valve and spaced therefrom, the closure member of said valve controlling the communication between the space so created and the explosion chamber, said space forming part of said conduit, means opening into said conduit in advance of said space for introducing air thereinto to dilute the rapidly moving coal dust-air suspension therein before the suspension reaches such space, an air conduit communicating with said space and operative to charge air into the diluted coal dust-air suspension still further to dilute the same, and a conduit for introducing air a third time into the twice diluted suspension, said last mentioned conduit opening into the coal dust-air stream immediately in advance of the closure member of the valve, whereby the diluting air enters the suspension while the latter is in rapid motion and a uniform distribution of the coal dust in the air is promoted.

16. In combination, an explosion chamber, a conduit for charging into said chamber a suspension of coal dust in air, an inlet valve for said chamber adapted to be intermittently operated by external mechanism, a check valve in said conduit adapted to be actuated to close the latter by a pressure wave resulting from a premature explosion in said chamber, the movable part of said valve being swept by the coal dust and air mixture flowing through the valve, and means operative independently of the pressure of the mixture conducted through the conduit to hold open the movable part of such check valve in the direction of flow of the mixture, whereby resistance to the flow of the mixture is reduced and precipitation of coal dust at such check valve prevented.

17. The combination of an explosion chamber, a conduit for conducting thereto a stable, rich suspension of coal dust in air at high velocity, a valve between said chamber and the delivery end of said conduit adapted to be intermittently operated by external mechanism, means arranged in advance of the closure member of the valve for charging air into such conduit to dilute the rapidly flowing air and coal dust suspension before its introduction into the chamber, whereby the diluting air enters the suspension while the latter is in rapid motion and a uniform distribution of the coal dust in the air is promoted, a second valve arranged adjacent to said first valve, for injecting an igniting fuel into said chamber substantially along the path traversed by the coal dust-air mixture, and a conduit for conducting an igniting fuel to said second valve.

18. The combination as set forth in claim 17 in which said second valve is in the form of a needle valve and is arranged concentrically with the first mentioned valve.

19. The combination of an explosion chamber, a conduit for conducting intermittently thereto a rapidly flowing suspension of coal dust in air, a valve between said chamber and the delivery end of said conduit adapted to be intermittently operated by external mechanism, an air conduit arranged in advance of the closure member of said valve and opening into said first mentioned conduit for charging air into the latter to dilute the coal dust suspension before its introduction into the chamber, said air conduit operative to charge air constantly into said first mentioned conduit, whereby after the charging of coal dust has ceased and while the valve is still open, the path traversed by the coal dust is swept clean of precipitated coal dust by a current of air.

HANS HOLZWARTH.